C. W. GILLESPIE.
CORN PLANTER.
APPLICATION FILED JUNE 20, 1912.

1,073,749.

Patented Sept. 23, 1913.

3 SHEETS—SHEET 2.

Witnesses
L. B. James
C. E. Hunt

Inventor
C. W. Gillespie
By H. B. Willson &Co
Attorney

C. W. GILLESPIE.
CORN PLANTER.
APPLICATION FILED JUNE 20, 1912.
1,073,749.
Patented Sept. 23, 1913.
3 SHEETS—SHEET 3.
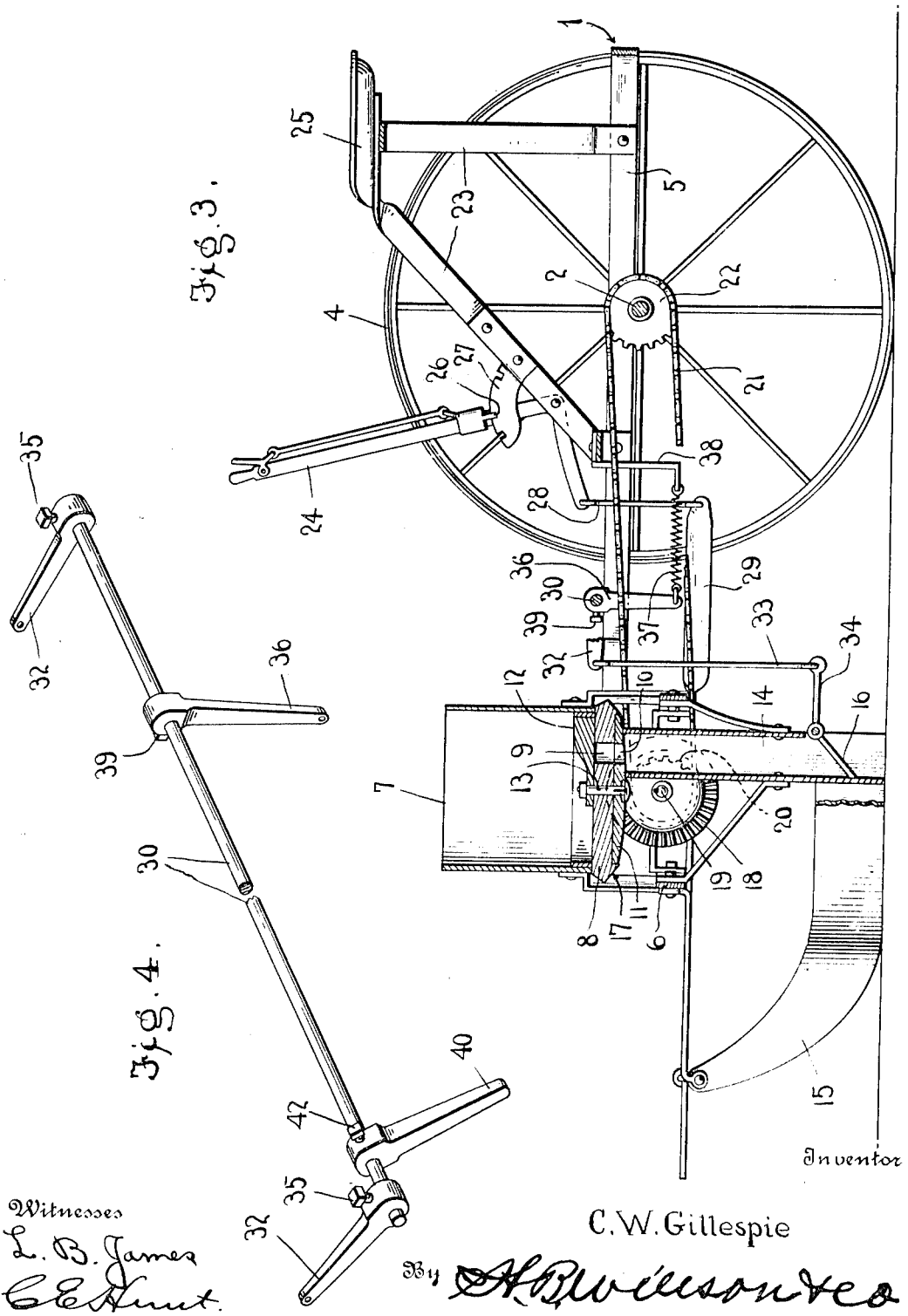

UNITED STATES PATENT OFFICE.

CHARLES W. GILLESPIE, OF ETNA GREEN, INDIANA.

CORN-PLANTER.

1,073,749.  Specification of Letters Patent.  Patented Sept. 23, 1913.

Application filed June 20, 1912.  Serial No. 704,847.

*To all whom it may concern:*

Be it known that I, CHARLES WOOD GILLESPIE, a citizen of the United States, residing at Etna Green, in the county of Kosciusko and State of Indiana, have invented certain new and useful Improvements in Corn-Planters; and I do declare the following to be a full, clear, and exact description of the invention, such as will enable others skilled in the art to which it appertains to make and use the same.

This invention relates to improvements in corn planters.

One object of the invention is to provide a corn planter having an improved construction and arrangement of seed depositing mechanism, and means attached to one of the wheels of the machine for periodically tripping said mechanism and thereby discharging the seed in rows at equal distances apart.

Another object of the invention is to provide a seed planter having means whereby the position of the deposited hills of seed will be marked when planted.

With these and other objects in view, the invention consists of certain novel features of construction, and the combination and arrangement of parts as will be more fully described and claimed.

Figure 1:
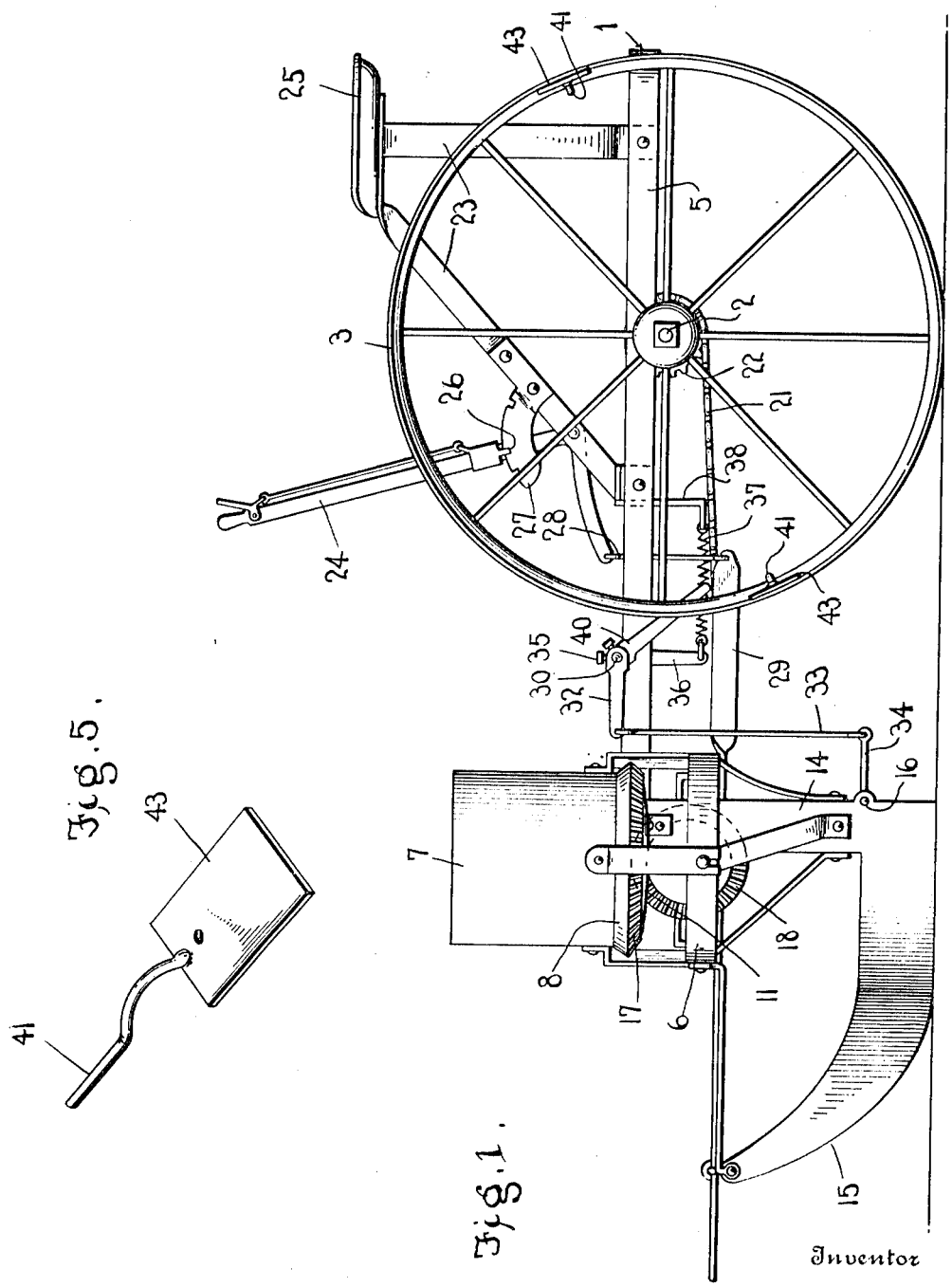
Figure 2:
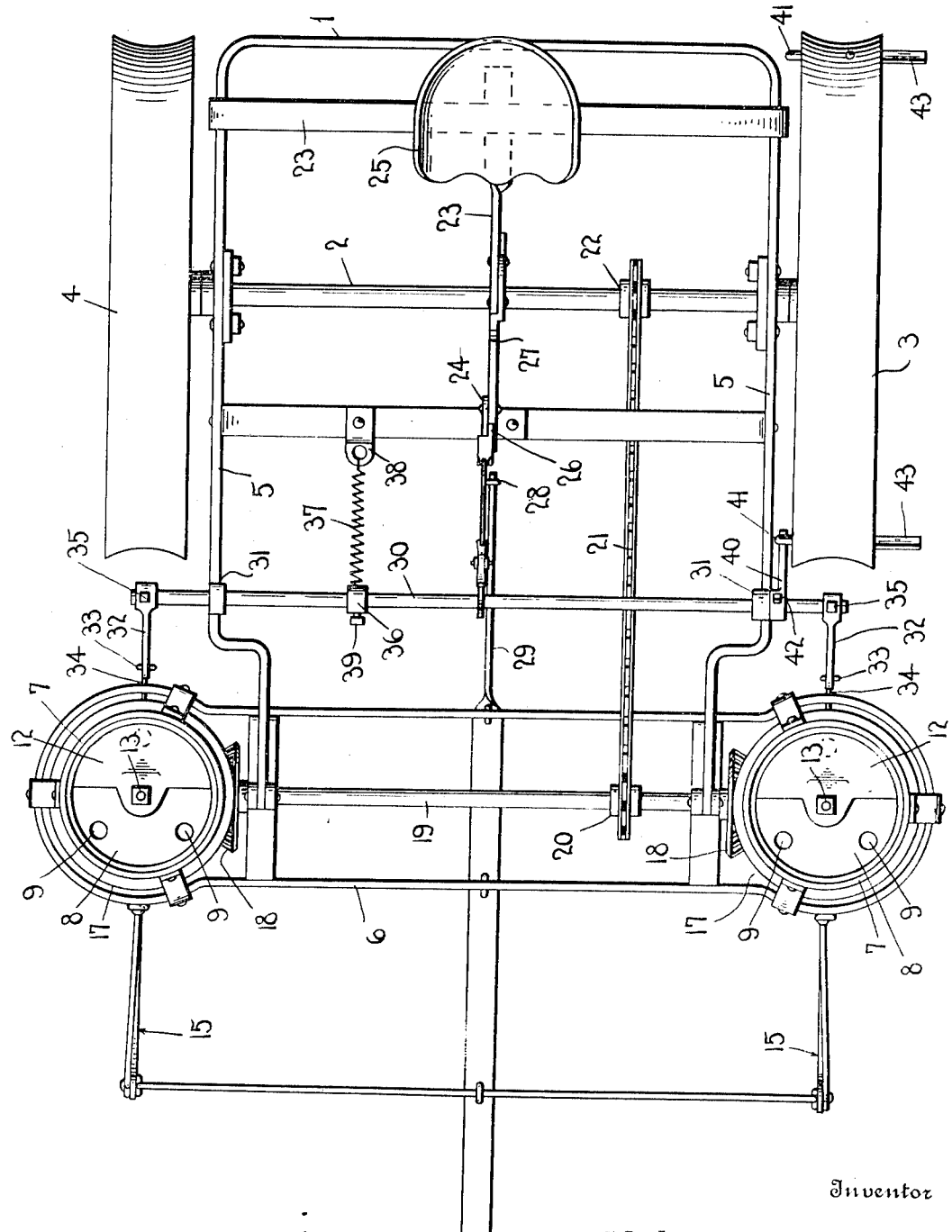

In the accompanying drawings, Figure 1 is a side view of a corn planter showing the application of the invention; Fig. 2 is a top plan view thereof; Fig. 3 is a vertical longitudinal section through one of the hoppers and parts in rear thereof; Fig. 4 is a detail perspective view of the rock shaft and the parts carried thereby; Fig. 5 is a detail perspective view of one of the trip devices and markers which are attached to and operated by one of the supporting wheels.

Referring more particularly to the drawings, 1 denotes the main supporting frame of the machine in which is revolubly mounted the axle 2 on one end of which is fixedly mounted a supporting and operating wheel 3, while on the opposite end is loosely mounted a supporting wheel 4. The side bars 5 of the frame extend forwardly and have pivotally connected to their outer ends a supplemental frame 6 which carries the seed hoppers 7 and depositing mechanism.

The hoppers 7 are secured to the ends of the frame 6 in any suitable manner and are provided with revolubly supported bottoms or feed disks 8 having therein series of seed pockets 9 which as the bottoms are revolved, are brought into register with a seed discharging passage 10 in valve plates 11 fastened to castings 12 secured in the lower portion of the seed hoppers. The plates 11 are fastened to the castings 12 by pivot bolts 13 on which the bottoms 8 revolve.

Secured to the plates 11 are seed discharge tubes 14 the lower ends of which are connected with furrow opening runners 15 of the usual or any suitable construction. In the rear ends of the runners 15 are pivotally mounted seed discharging valves 16 which are adapted to close the lower ends of the tubes 14. The upper ends of the tubes 14 are disposed below the discharge passages 10 in the plates 11 whereby when the seed is brought around by the pockets 9 in the bottoms 8 to the passages 10 the seed will drop through from the pockets through said passages and into the seed tubes from which said seed is discharged into the furrow at the proper time by the opening of the valve.

On the outer edges of the revolubly mounted bottoms 8 of the hoppers are beveled gear rings 17 with which are engaged bevel gear pinions 18 on the ends of an operating shaft 19 revolubly mounted in bearings in the supplemental frame 6. On the shaft 19 is also fixed a sprocket gear 20 which is connected by a sprocket chain 21 with a sprocket pinion 22 on the axle 2 of the machine whereby when the axle is revolved by the wheel 3, the movement thereof will be imparted to the shaft 19 and the latter is thus driven to operate the revolving bottoms or plates of the hoppers as will be readily understood.

On the main frame 1 are secured seat supporting bars 23 to one of which is pivotally connected a bell crank lever 24 one end of which extends upwardly and is provided with a handle within convenient reach of the driver from the seat 25 on the upper ends of the bars 23. The lever 24 is provided with a pawl 26 adapted to be engaged with a segmental rack 27 whereby the lever is locked in its adjusted position. The other end or arm of the lever 24 is connected by a short link 28 with the rear end of the draft tongue 29 of the machine, said tongue being secured to the supplemental frame 6 whereby when the lever 24 is swung in one direction or the other the frame 6 will be rocked on its pivotal connection with the outer ends